UNITED STATES PATENT OFFICE.

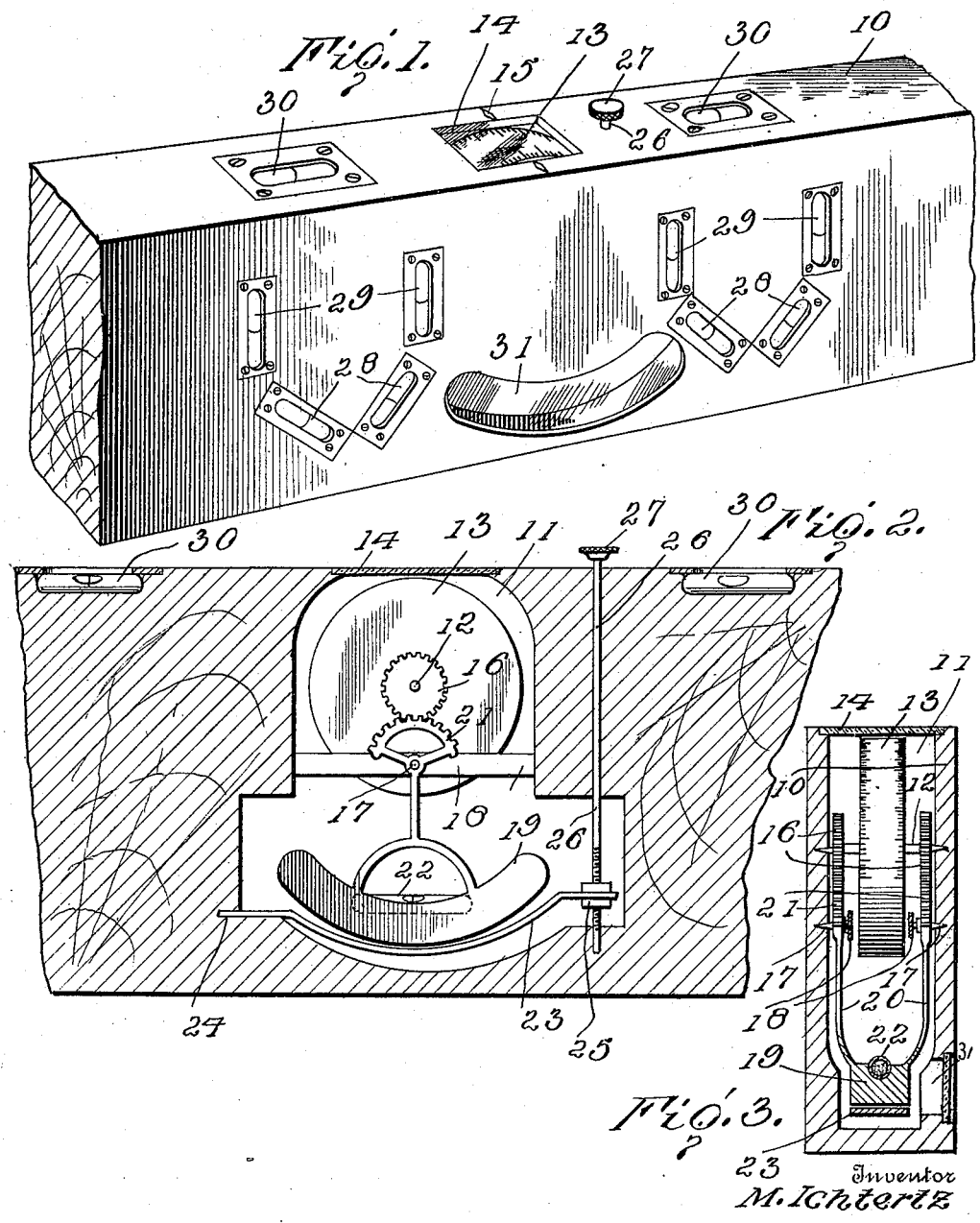

MICHAEL ICHTERTZ, OF TORQUAY, CALIFORNIA.

LEVEL.

983,622. Specification of Letters Patent. Patented Feb. 7, 1911.

Application filed February 4, 1910. Serial No. 541,990.

*To all whom it may concern:*

Be it known that I, MICHAEL ICHTERTZ, citizen of the United States, residing at Torquay, in the State of California, have invented certain new and useful Improvements in Levels, of which the following is a specification.

This invention relates to measuring instruments and refers particularly to certain improvements on a level for which Letters Patent #941,368, was granted November 30, 1909.

An object of this invention is to so arrange the stock of the measuring instrument that a dial of considerable size may be employed without the necessity of enlarging the stock, and in which the gears may be greatly reduced in size, to effect an instrument of fine adjustment by producing a distinct movement of the dial upon a slight deviation of the angle of the stock.

The invention has for another object the provision of means in a level of this character whereby the action of the pendant weight can be readily determined so as to ascertain whether or not the weight is sticking or is freely actuating.

The invention further aims to provide a stock for a level with means for indicating when the stock is disposed in certain predetermined planes, the planes being at angles most commonly used, as at forty-five and ninety degrees to the horizontal plane.

For a full understanding of the invention reference is to be had to the following description and accompanying drawing, in which:

Figure 1 is a perspective view of the central portion of the stock having the improvements applied thereto. Fig. 2 is a longitudinal vertical section through the device as disclosed in Fig. 1, and Fig. 3 is a central transverse section of the same.

Corresponding and like parts are referred to in the following description and indicated in all the views of the drawing by the same reference characters.

Referring to the drawing the numeral 10 designates the stock of the level which is preferably rectangular in cross-section and may be formed in any desired length. The central portion of the stock 10 is chambered as at 11 for the reception of the coöperative elements herein set forth.

In the upper portion of the chamber 11 a shaft 12 is transversely disposed which is received at its opposite ends in the inner walls of the chamber 11. Arranged on the central portion of the shaft 12 is a dial 13 which is of cylindrical formation and has a graduated periphery which is disposed slightly below the upper face of the stock 10 and within the chamber 11. The stock 10 is provided with an opening 14 through which the readings on the dial 13 may be made with reference to indicating marks 15 which are formed upon the upper face of the stock 10 at the opposite sides of the opening 14. The opposite ends of the shaft 12 are provided with gears 16 which are of like size and which operate against the inner walls of the stock 10. Arranged beneath the shaft 12 and in vertical alinement therewith are arbors 17, the same being disposed at the opposite sides of the dial 13 and engaged at their opposite extremities in the inner walls of the stock 10 and braces 18 which are carried within the chamber 11. The braces 18 are terminated at the opposite ends of the chamber 11 within the stock 10 and are arranged in alinement with the arbors 17 so as to support their inner extremities.

Within the lower end of the chamber 11, a weight 19 is positioned which is of arcuate form and which carries a pair of fork-arms 20 which are upwardly extended from the opposite longitudinal edges of the weight 19 and are preferably formed integral therewith. The arms 20 are diverged at their upper ends to lie in the planes of the gears 16 and carry upon their upper extremities toothed segments 21. The arbors 17 are passed through the central portions of the segments 21 to hingedly support the fork-arms 20 and to thereby suspend the weight 19. Centrally within the upper edge of the weight 19 a spirit-tube 22 is seated which, owing to the arcuate formation of the weight 19, is discernible at its central portion from the sides of the weight 19. The spirit-tube 22 is employed for determining when the weight 19 is in a horizontal plane.

In the lower end of the chamber 11 a curved strip 23 is disposed which is hinged as at 24 at one end, while its opposite end is provided with a boss 25 internally threaded for the reception of the threaded lower extremity of an operating rod 26. The rod 26 is passed upwardly through the stock 10 and terminates at its upper end in a button 27 adapted to be engaged by the fingers of the operator for rotating the rod 26. The strip 23 is so positioned that the curved portion thereof engages against the lower side of the weight 19, and retains the same from vibration as the level is conveyed from place to place.

It will be observed from Fig. 1 that the side of the stock 10 is provided with pluralities of spirit-tubes, the tubes 28 of which are arranged at angles of 45° to the base of the stock 10, and are diverged so as to determine such angles in either direction.

Arranged above the spirit-tubes 28 are second sets of tubes 29 which are disposed at angles of 90° to the base of the stock 10, in order to determine when the stock is positioned at right angles to the normal horizontal position of the same. The upper base or edge of the stock 10 is also provided with spirit-tubes 30 arranged at the opposite sides and in spaced relation from the opening 14, which tubes indicate when the stock 10 is in a true horizontal plane when resting upon its base.

It will be observed from Figs. 1 and 3 that the stock 10 is provided at one side with an opening or slot 31 which registers with the weight 19 so as to enable the operator to observe the reading of the spirit-tube, and to thereby ascertain the position of the weight.

Having thus described the invention what is claimed as new is:—

1. A level including a stock having a central chambered portion, a shaft arranged transversely in the chambered portion of said stock, a dial mounted centrally on said shaft, gears carried upon the opposite ends of said shaft within the chamber, arbors arranged beneath said gears at the opposite sides of said dial, fork-arms pivotally mounted upon said arbors and depending therefrom, a weight located upon the lower ends of said fork-arms, and toothed segments formed upon the upper ends of said arms above said arbors to mesh with said gears.

2. A level including a stock, a shaft located in said stock, a dial mounted centrally on said stock, gear-wheels arranged at the opposite sides of said dial and upon said shaft, toothed segments meshing with said gear-wheels, arbors carried by said stock for supporting said segments, fork-arms depending from said segments, and a weight rigidly mounted upon the lower ends of said fork-arms.

3. A level including a stock, a shaft transversely disposed in said stock, a dial located on said shaft, gears arranged upon the opposite ends of said shaft, arbors carried by said stock and spaced beneath said gears, a weight arranged in the stock, fork-arms upwardly extending from the opposite longitudinal edges of said weight and pivotally connected upon said arbors, segments formed upon the upper ends of said arms and extending upwardly from said arbors to mesh with said gears, and a spirit-tube seated in the upper edge of said weight to determine the horizontal plane thereof.

4. In a level the combination with a stock, a shaft transversely arranged in said stock, and a cylindrical dial carried by said shaft, of gears arranged at the opposite ends of said shaft, segments pivotally carried in said stock and meshing with said gears, fork-arms depending from said segments, and a weight rigidly disposed upon the lower ends of said fork-arms.

5. A level including a stock, a shaft transversely arranged in said stock, a cylindrical dial mounted on said shaft, gears carried by said shaft, braces arranged longitudinally within the stock at the opposite sides of said gears, arbors journaled at the opposite ends in said braces and in the opposite inner walls of said stock, fork-arms pivotally mounted upon said arbors and depending therefrom, an arcuate weight rigidly mounted upon the lower ends of said fork-arms, a toothed segment carried upon the upper end of each of said fork-arms to mesh with said gears, and means carried by said weight for determining when the same is in a horizontal plane.

6. A level including a stock, a shaft journaled in the stock, a dial mounted upon the shaft, gear wheels carried upon the ends of the shaft, arbors disposed in the stock, and toothed segments located on the arbors and meshing with the gear-wheels and having depending fork-arms, the fork-arms having a weight upon their lower extremities.

In testimony whereof I affix my signature in presence of two witnesses.

MICHAEL ICHTERTZ. [L. S.]

Witnesses:
 H. L. GOOD,
 R. C. BADEN.